Sept. 11, 1956  L. SPRARAGEN  2,762,090
WEATHERSEAL AND MEANS FOR MOUNTING THE SAME
Filed Oct. 20, 1953
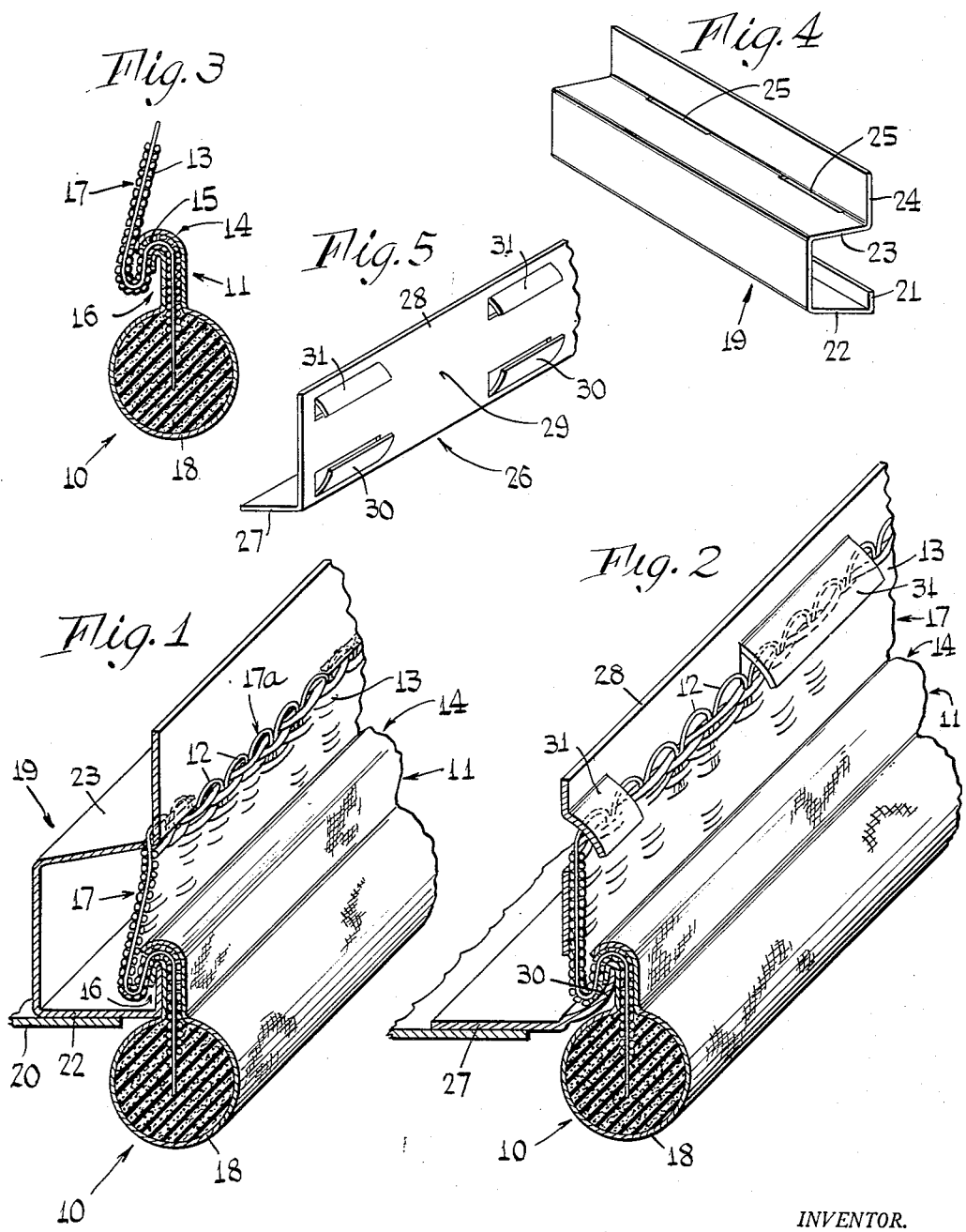
INVENTOR.
Louis Spraragen
BY
Johnson and Kline
ATTORNEYS

# United States Patent Office 2,762,090
Patented Sept. 11, 1956

2,762,090

WEATHERSEAL AND MEANS FOR MOUNTING THE SAME

Louis Spraragen, Fairfield, Conn., assignor to Bridgeport Fabrics, Inc., Bridgeport, Conn., a corporation of Connecticut Application October 20, 1953, Serial No. 387,221

12 Claims. (Cl. 20—69)

This invention relates to a novel weatherseal or weatherstrip and to mounting means therefor.

It is an object of the present invention to provide a weatherseal or weatherstrip and mounting therefor which can be readily manufactured and easily installed and which mounting means will securely hold the weatherseal in sealing position against normal sealing pressures.

Another object of the invention is to provide a weatherseal or weatherstrip which can be easily hung in the mounting means and which can be interlocked therewith to hold the weatherseal in position thereon without the use of special tools.

In carrying out these objects the present invention provides an elongate, rigid mounting member having a lower flange or hanger member adapted to cooperate with a hanger portion on the resilient mounting member for the weatherseal to support the same and having in spaced relation thereto means for interlocking with the edge of the anchoring portion of the resilient mounting member for the weatherseal to securely hold it in place on the mounting member.

A feature of the invention resides in the novel construction of the mounting member for the weatherseal whereby it is bent to form a hanger or bead-facing channel which is adapted to receive the hanger flange on the mounting member to quickly and readily support the weatherseal in position thereon.

Another feature of the invention resides in the novel means whereby the edge of the resilient mounting member on the weatherseal can be snapped or otherwise inserted into interlocked relation with the rigid mounting member to effectively secure the weatherseal in position.

Another feature of the invention resides in the fact that the rigid mounting member which can be readily installed in the automobile body can take various forms and the weatherstrip will cooperate to effectively hold the weatherseal in position thereon by a simple operation.

Other features and advantages of the invention will be apparent from the specification and claims when considered in connection with the drawings in which:

Figure 1 shows a fragmentary perspective view, partly in section, of one form of the weatherseal and mounting means therefor.

Fig. 2 shows a view similar to Fig. 1 of another form of the weatherseal and mounting therefor.

Fig. 3 is a sectional view of the weatherseal shown in Fig. 1.

Fig. 4 is a perspective rear view showing the rigid mounting member of Fig. 1.

Fig. 5 is a perspective view of the rigid mounting member of Fig. 2.

As shown in the drawings, the weatherseal of the present invention comprises a bead 10 of any suitable sealing material, herein illustrated as sponge rubber. The bead has connected thereto an elongate resilient mounting and anchoring member or strip 11 which has one edge connected to the bead so that the mounting member projects therefrom.

In the preferred form of the invention the mounting member includes resilient, metal reenforcing members extending transversely of the strip and terminating at the free edge of the strip. While these may be formed by slitting sheet material, in the herein illustrated form of the invention, they are formed as transversely extending wire loops 12 in a woven strip having fiber warps 13.

A feature of the present invention resides in the provision in the mounting and anchoring member of a hanger portion 14 by which the weatherseal can be readily supported. The hanger portion is herein illustrated as being formed by bending a reverse curve 15 in the mounting member adjacent the bead to provide a bead-facing channel 16 by which the weatherseal can be hung and supported in a manner to be described. The anchoring portion 17 of the mounting and anchoring member can be inclined, as shown in Figs. 1 and 3, so that the free edge is in line with the secured edge or can extend straight out as at 17a with the edge offset as shown in Fig. 2.

If desired, a cover 18 of textile or other suitable covering material can be applied to extend around the bead and over a portion of the mounting and anchoring member.

The weatherseal, in accordance with the present invention, can be easily and readily mounted in a vehicle body without the requirement of special tools or other fastening devices.

In carrying out the invention in accordance with the form shown in Figs. 1 and 4, a substantially C-shaped, rigid, elongate mounting member 19 is adapted to be secured by any suitable means to a support 20 which may be a part of the vehicle body. The rigid mounting member is provided with a flange 21 at the end of the lower leg 22 of the C which extends upwardly and forms a hanger flange adapted to be inserted into the bead-facing channel 16 of the weatherseal, when the weatherseal is located in position, to hang and support the same thereon. The upper leg 23 of the C is provided with an upwardly extending flange 24 and the leg is provided with slots 25 immediately adjacent the back of the flange, as shown in Fig. 4. With this construction, the weatherstrip can be anchored in place after it has been inserted over the hanger by having portions of the wire loops 12 at the free edge of the anchoring strip positioned in the slots, as shown in Fig. 1, with the remaining portions of the loops engaging the front face of the flange, thus securely anchoring the bead in position and resisting any movement thereof under the usual sealing pressures so that the weatherseal forms an effective seal.

Moving the edge into interlocked relation with the slots may be accomplished in many ways. Preferably, portions of the edge are snapped under the upper flange with the fiber warps 13 compressing slightly and permitting the loops 12 to become exposed to a greater extent and to project into the slots 25 a required distance.

In the form of the invention shown in Figs. 2 and 5, the elongate rigid mounting member is illustrated as an L-shaped member 26 having one leg 27 secured to the support 20 of the vehicle and the other leg 28 provided with a planar surface 29. The means for mounting the weatherseal on the rigid member comprises lower, upwardly extending flanges 30 projecting from said surface and upper, downwardly extending flanges 31 spaced from the lower flanges a distance so as to overlie the upper edge of the anchoring portion of the resilient mounting and anchoring strip. While the flanges may be made in any suitable way, they are herein illustrated as lanced out of and formed from the rigid member in predetermined spaced relation along the rigid member. While the upper and lower flanges may be arranged in alternate relation or in any other selected pattern, they are herein illustrated as being opposed to the lower, upwardly extending flanges.

When it is desired to mount the weatherseal on this form of mounting means as shown in Fig. 2, the lower flanges 30 are inserted into the bead-facing channel 16 of the weatherseal to support and hang the weatherseal therefrom. The upper edge of the anchoring portion 17 is then inserted under the upper flanges, either by snapping the edge in place due to the resiliency of the wire, or by bending the wire and inserting the edge under and then straightening the wire after the edge is in place.

The weatherseal of the present invention, when mounted as herein disclosed, will be supported by the hanger portion and securely held in place by the anchoring portion against sealing pressures normally encountered in use.

It will be seen therefore, that I have provided a novel weatherseal which can be quickly and easily made and a novel mounting means cooperating therewith whereby it can be readily mounted in the body of an automobile or other vehicle without the use of additional tools or separate fastening means.

Variations and modifications may be made within the scope of the claims and portions of the improvements may be used without others.

I claim:

1. In combination, an elongate rigid mounting member having an upwardly extending weatherseal mounting flange and spaced weatherseal holding means; and a weatherseal to be mounted on the rigid mounting member and comprising a bead and a resilient mounting and anchoring member therefor, said resilient mounting member projecting exteriorly of the bead and having a longitudinally extending bent portion intermediate the edges of the projecting portion and forming a reverse curve providing a bead-facing channel adapted to receive said mounting flange to support the weatherseal thereon with the other edge inserted into holding relation with said holding means on the rigid mounting member.

2. In combination, an elongate rigid mounting member having an upwardly extending weatherseal supporting flange and spaced weatherseal holding means; and a weatherseal to be mounted on the rigid mounting member and comprising a bead and a resilient mounting and anchoring member therefor, said resilient mounting member projecting exteriorly of the bead and including metallic members terminating at the free edge of the member, said member having a longitudinally extending bent portion intermediate the edges of the projecting portion and forming a reverse curve providing a bead-facing channel adapted to receive said supporting flange to support the weatherseal thereon with the terminal portions of the metallic members at the other edge of said member being snapped into holding relation with said holding means on the rigid mounting member.

3. In combination, an elongate rigid C-shaped mounting member having an upwardly extending weatherseal mounting flange on the lower leg of the C and an upwardly extending flange on the upper leg of the C with said upper leg having spaced slots therein adjacent the flange; and a weatherseal to be mounted on the rigid mounting member and comprising a bead and a resilient mounting and anchoring member therefor, said resilient mounting member projecting exteriorly of the bead and having a hanger portion intermediate the edges to be positioned over the flange on the lower leg of the C to hang the weatherseal thereon with the other edge of the anchoring member being inserted into said slots and into holding relation with said flange on the upper leg of the C-shaped mounting member.

4. In combination, an elongate rigid C-shaped mounting member having an upwardly extending weatherseal mounting flange on the lower leg of the C and an upwardly extending flange on the upper leg of the C with said upper leg having spaced slots therein in back of the flange; and a weatherseal to be mounted on the rigid mounting member and comprising a bead and a resilient mounting and anchoring member therefor, said resilient mounting member projecting exteriorly of the bead and having a reversely curved portion intermediate the edges forming a bead-facing channel adapted to be positioned over the flange on the lower leg of the C to hang the weatherseal thereon with portions of the other edge of the anchoring member being snapped into said slots and the remaining portions of the other edge engaging the face of said flange on the upper leg of the C-shaped mounting member.

5. In combination, an elongate rigid C-shaped mounting member having an upwardly extending weatherseal mounting flange on the lower leg of the C and an upwardly extending flange on the upper leg of the C with said upper leg having spaced slots therein adjacent the flange; and a weatherseal to be mounted on the rigid mounting member and comprising a bead and a resilient mounting and anchoring member therefor comprising woven textile warps and transversely extending wire loops, said resilient mounting member projecting from the bead and having a reversely curved bend intermediate the edges forming a bead-facing channel adapted to be positioned over the flange on the lower leg of the C to hang the weatherseal thereon with some of the loops at the other edge of the anchoring member being inserted into said slots and other of said loops engaging the face of said flange on the upper leg of the C-shaped mounting member to anchor the weatherseal to the mounting member.

6. In combination, an elongate rigid mounting member provided with a planar surface having a lower upwardly extending weatherseal supporting flange means and an upper, spaced, opposed, downwardly extending anchoring flange means projecting exteriorly of said surface to form weatherseal holding means; and a weatherseal to be mounted on the rigid mounting member and comprising a bead and a resilient mounting an anchoring member therefor, said resilient mounting member projecting from the bead and having a hanger portion intermediate the edges of the projecting portion to receive said upwardly extending flange means to support the weatherseal thereon with the other edge of the resilient mounting member being inserted into holding position under said downwardly extending flanges on the rigid mounting member.

7. In combination, an elongate rigid mounting member provided with a planar surface and having portions projecting therefrom and forming upwardly extending weatherseal supporting flange means and other portions projecting therefrom in spaced, opposed relation to said supporting flange means and forming downwardly extending anchoring flange means; and a weatherseal to be mounted on the rigid mounting member and comprising a bead and a resilient mounting and anchoring member therefor, said resilient mounting member projecting exteriorly of the bead and having a hanger portion intermediate the edges of the projecting portion to receive said upwardly extending flange means to support the weatherseal thereon with the other edge of the resilient mounting member being inserted into holding position with said downwardly extending flanges on the rigid mounting member overlying said other edge.

8. In combination, an elongate rigid mounting member provided with a planar surface having a plurality of longitudinally spaced, upwardly extending weatherseal supporting flange means and a plurality of longitudinally spaced, downwardly extending anchoring flange means located in spaced relation thereto, said flange means projecting from said surface to form weatherseal holding means; and a weatherseal to be mounted on the rigid mounting member and comprising a bead and a resilient mounting and anchoring member therefor, said resilient mounting member projecting exteriorly of the bead and having a longitudinally extending reverse curve intermediate the edges of the projecting portion forming a longitudinally extending bead-facing channel adapted to receive said upwardly extending flange means to support the weatherseal thereon with the other edge of the resilient mounting member being inserted into holding position with said downwardly extending flanges on the rigid mounting member overlying said other edge.

9. A weatherseal comprising a bead and a resilient mounting and anchoring member having one edge embedded in the bead, said member projecting exteriorly of the bead and having a longitudinally extending reverse curve formed intermediate the edges of the projecting portion and forming a bead-facing channel adapted to receive a mounting flange and hang the weatherseal thereon.

10. A weatherseal comprising a bead and a resilient mounting and anchoring member including a metal reenforcing portion having one edge embedded in the bead, said member projecting exteriorly of the bead and having a longitudinally extending reverse curve intermediate the edges of the projecting portion and forming a bead-facing channel adapted to receive a mounting flange and hang the weatherseal thereon.

11. A weatherseal comprising a bead and a resilient mounting and anchoring member of woven fiber warps and transversely extending wires having one edge embedded in the bead, said member projecting exteriorly of the bead and having a longitudinally extending reverse curve intermediate the edges of the projecting portion and forming a bead-facing channel adapted to receive a mounting flange and hang the weatherseal thereon.

12. A weatherseal comprising a bead and a resilient mounting and anchoring member including transversely extending metal members terminating adjacent a free edge and having the other edge embedded in the bead, said member projecting exteriorly of the bead and having a longitudinally extending reverse curve intermediate the edges of the projecting portion and forming a bead-facing channel adapted to receive a mounting flange and hang the weatherseal thereon.

References Cited in the file of this patent

UNITED STATES PATENTS

| 2,004,364 | Best | June 11, 1935 |
| 2,702,416 | Bright | Feb. 22, 1955 |

FOREIGN PATENTS

| 132,934 | Australia | May 30, 1949 |
| 631,890 | Great Britain | Nov. 11, 1949 |
| 649,137 | Great Britain | Jan. 17, 1951 |